United States Patent [19]

Fontenot et al.

[11] Patent Number: 5,686,518
[45] Date of Patent: Nov. 11, 1997

[54] MINIEMULSION POLYMERIZATION PROCESS USING POLYMERIC CO-SURFACTANT

[75] Inventors: Kevin J. Fontenot, Kingsport, Tenn.; F. Joseph Schork; Jay L. Reimers, both of Atlanta, Ga.

[73] Assignee: Georgia Tech, Atlanta, Ga.

[21] Appl. No.: 367,921

[22] Filed: Jan. 3, 1995

Related U.S. Application Data

[63] Continuation of Ser. No. 135,273, Oct. 12, 1993, abandoned.

[51] Int. Cl.$^6$ .................................................. C08F 2/16
[52] U.S. Cl. ................ 524/458; 524/459; 524/503; 524/515; 524/523; 524/524; 524/525; 524/529; 524/533; 524/534; 526/201
[58] Field of Search ................................. 524/457, 458, 524/460, 459, 503, 533, 525, 515, 523, 529, 524, 534; 526/201

[56] References Cited

U.S. PATENT DOCUMENTS

| | | | |
|---|---|---|---|
| 2,133,257 | 10/1938 | Strain | 526/201 |
| 3,707,585 | 12/1972 | Okamoto et al. | 526/201 |
| 3,723,571 | 3/1973 | Haskell | 526/201 |
| 3,907,730 | 9/1975 | Jones | 526/201 |
| 3,980,603 | 9/1976 | Bradley et al. | 524/832 |
| 4,011,388 | 3/1977 | Murphy et al. | 526/320 |
| 4,075,134 | 2/1978 | Morehouse, Jr. et al. | 524/533 X |
| 4,255,545 | 3/1981 | Hurlock et al. | 526/201 |
| 4,294,740 | 10/1981 | Mizuguchi et al. | 524/458 |
| 4,328,149 | 5/1982 | Morse et al. | 526/201 X |
| 4,459,378 | 7/1984 | Ugelstad | 523/205 |
| 4,469,839 | 9/1984 | Maruhashi et al. | 524/458 |
| 4,500,649 | 2/1985 | Tanaka et al. | 502/167 |
| 4,518,724 | 5/1985 | Kuloujima et al. | 524/458 X |
| 4,539,362 | 9/1985 | Davies et al. | 526/201 X |
| 4,677,173 | 6/1987 | Hölle et al. | 126/4 |
| 4,694,035 | 9/1987 | Kasai et al. | 526/201 X |
| 4,777,207 | 10/1988 | Redman | 524/458 |
| 4,885,350 | 12/1989 | Yamashita et al. | 526/201 |
| 4,927,876 | 5/1990 | Coogan et al. | 524/507 X |
| 5,043,404 | 8/1991 | Mahabadi et al. | 526/194 |
| 5,106,903 | 4/1992 | Vanderhoff et al. | 524/458 |
| 5,124,394 | 6/1992 | Lenney | 524/458 X |
| 5,133,992 | 7/1992 | Nair et al. | 427/213.34 |
| 5,179,151 | 1/1993 | Yang | 524/458 |
| 5,272,228 | 12/1993 | Mailhos-Lefievre | 526/81 |
| 5,349,022 | 9/1994 | Ashihara et al. | 524/458 |

*Primary Examiner*—Judge M. Reddick
*Attorney, Agent, or Firm*—Oldham & Oldham Co., L.P.A.

[57] ABSTRACT

An essentially stable monomer miniemulsion characterized by small monomer droplet size is prepared and is then polymerized to a polymer latex under free radical polymerization conditions. The monomer miniemulsions herein include, in addition to water, a surfactant, and a monomer or mixture thereof, one or more polymers which function as a polymeric co-surfactant. The monomer miniemulsions are characterized by average monomer droplet size of 10 to 500 nanometers, preferably 80 to 150 nanometers. The amount of polymer added as a co-surfactant is about 0.5 to about 5 percent by weight based on monomer weight. The monomer emulsion may contain either a single monomer or a monomer mixture. The monomer emulsion is polymerized under conventional emulsion polymerization conditions yielding a polymer latex having an average polymer particle size of 10 to 500 nanometers, preferably 80 to 150 nanometers, and a narrow particle size distribution, i.e., a polydispersity index of about 1.05 to about 1.40. A representative monomer is methyl methacrylate and a representative polymer as co-surfactant is polymethyl methacrylate.

25 Claims, No Drawings

MINIEMULSION POLYMERIZATION PROCESS USING POLYMERIC CO-SURFACTANT

This is a continuation of application(s) Ser. No. 08/135,273 filed on Oct. 12, 1993, now abandoned.

TECHNICAL FIELD

This invention relates to emulsion polymerization processes. In particular, this invention relates to emulsion polymerization processes in which both the monomer or monomer mixture undergoing polymerization and the resultant polymer particles have very small particle size. Hence the process described herein will be referred to as a miniemulsion polymerization process.

BACKGROUND OF THE INVENTION

Emulsion polymerization is a widely used technique which has been extensively described in literature, including patents. Production of synthetic latexes via emulsion polymerization is well-known. Among the polymers commonly produced by emulsion polymerization are styrene-butadiene copolymers, acrylic polymers, and polyvinyl acetate. Polymers prepared by emulsion polymerization are widely used as binders in water-based latex paints for both interior and exterior use. Emulsion polymerization is also used to prepare polymer foams and polymers used as coatings.

Basically, emulsion polymerization requires the following key ingredients: water, a monomer or mixture thereof, a surfactant or mixture thereof, and a polymerization initiator. The monomer or mixture thereof is typically dispersed into droplets. Polymer particles are formed during polymerization with the aid of a surfactant or mixture thereof and high shear agitation. Monomer droplets diameters are typically from 1 to 10 microns. The product polymer typically has a broad particle size distribution.

Problems associated with conventional polymer emulsions or latexes include: instability due to large particle size, lack of reproduceability, and variations in particle size. Particle size instability is also observed in conventional monomer emulsions. The smaller monomer droplets will disappear by two mechanisms. The first is flocculation into larger droplets. This can be effectively prevented by providing an adequate layer of surfactant at the droplet surface. The second is Ostwald ripening. This phenomenon consists of the diffusion of monomer out of the smaller droplets and into the larger ones. (The polymer does not so diffuse.) The net effect is a reduction in interfacial surface area, and hence, of surface free energy. Any droplet distribution produced by shear phenomena will necessarily have a broad distribution. In an unpolymerized conventional emulsion (which will be called herein a "macroemulsion"), the disappearance of the small droplets takes place in seconds. This precludes the nucleation of these droplets into polymer particles.

Commercial emulsion polymerizations are often seeded with polymer particles of known size and concentration, manufactured specifically for use as seed particles. The seed particles, when exposed to monomer in the form of monomer droplets, swell to an equilibrium size. Under proper polymerization conditions, no new particles are formed, and the polymerization comprises growing these swollen seed particles. Seeding technology allows tight control over particle number and particle size distribution, but is dependent on the rate and extent of particle swelling.

Recent studies have shown that smaller monomer droplet size and greater uniformity of size can be achieved by use of a water insoluble liquid organic compound as a phase stabilizer. Representative organic compounds used in this manner include hexadecane and cetyl alcohol. These compounds are commonly referred to as co-surfactants, although they may not actually play a surfactant role. They do affect appreciable size reduction and greater stability of monomer emulsions. For example, a methyl methacrylate (MMA) aqueous emulsion containing such a co-surfactant will have a typical average droplet size of only 0.01 to 0.5 microns, and will exhibit considerably greater stability (as shown by time required to settle out on standing) than will an emulsion of the same monomer (and otherwise the same formulation) but without the co-surfactant. A disadvantage of processes of this type is that the co-surfactant must be removed after polymerization is complete.

U.S. Pat. No. 4,011,388 to Murphy, et al, relates to a process for preparing an aqueous polymer emulsion from an aqueous monomer-polymer dispersion. Polymer particles in the product polymer emulsions have average diameters of 0.01 to 5 microns. Polymer is present in 10–80 parts by weight, and monomer is present in 90–20 parts by weight. Preferred ranges are 20–60 parts by weight polymer and 80–40 parts monomer.

SUMMARY OF THE INVENTION

This invention according to one aspect provides a process for miniemulsion polymerization of a monomer or mixture thereof, which comprises:

dissolving one or more polymers in an ethylenically unsaturated monomer or mixture thereof, thereby forming a polymer-in-monomer solution, and combining the polymer-in-monomer solution with water and at least one surfactant and agitating the resulting mixture, wherein:

(1) said monomer or mixture thereof is substantially insoluble in water;

(2) said one or more polymers are substantially insoluble in water but soluble in said monomer or mixture thereof;

(3) said one or more polymers have a viscosity average molecular weight of at least about 3000; and (4) the mount of said one or more polymers is from about 0.5 percent to about 5 percent based on the combined weights of monomer(s) and polymer(s), thereby obtaining an essentially stable aqueous monomer emulsion comprising an aqueous continuous phase and an organic disperse phase. The disperse phase comprises a monomer or mixture thereof and one or more polymers, and is in the form of droplets having an average droplet diameter in the range from about 10 to about 500 nanometers.

The polymer context (i.e., the one or more polymers) of the disperse phase of the monomer emulsion will be referred to herein as a "polymeric co-surfactant". The polymer content of the disperse phase accomplishes a reduction in monomer droplet size and a vast improvement in monomer emulsion stability without introducing an extraneous component into the disperse phase of the emulsion, as do hexadecane and cetyl alcohol. By analogy, the term "co-surfactant", which has been applied previously to hexadecane and cetyl alcohol, is applied herein to the polymer content of the monomer emulsion.

This process according to a further aspect provides a monomer emulsion having the composition and monomer droplet size characteristics enumerated above.

This invention according to a still further aspect provides a latex or polymer emulsion which is the product obtained by polymerizing the monomer emulsion under free radical polymerization conditions. The polymer content is in the form of particles having an average particle size in the range from about 50 to about 500 nanometers.

Monomer emulsions of this invention have improved stability compared to monomer emulsions used in conventional emulsion polymerization processes, in which no co-surfactant is employed.

The process of this invention is less susceptible to contamination and operating errors than are conventional emulsion polymerization processes.

The final product latex or polymer emulsion of this invention is far more shear-stable than the products of conventional emulsion polymerization. Also, a latex of this invention has a higher monodispersity (i.e., a lower polydispersity index), which denotes a greater uniformity of particle size, than is the case in conventional latexes produced by conventional emulsion polymerization.

The latexes or polymer emulsions prepared according to the present invention have the same uses as do latexes produced by conventional emulsion polymerization. In addition, the latexes prepared according to the present invention are also useful as particle size standards due to their degree of monodispersity. Such standards are useful for calibrating analytical instruments, particularly those used in the medical field.

DETAILED DESCRIPTION OF THE INVENTION

The term "latex" herein denotes a polymer emulsion. The terms "latex" and "polymer emulsion" will be used interchangeably in this specification. The product of the polymerization process of this invention is a latex.

The term "miniemulsion" herein denotes a monomer emulsion in which the average monomer droplet size is not in excess of about 500 nanometers (0.5 micron). This term is used to distinguish monomer emulsions and emulsion polymerization processes herein from conventional emulsion polymerization processes and starting monomer emulsions. Conventional starting monomer emulsions will be called "macroemulsions" herein.

The term "molecular weight" has its usual meaning to denote grams per gram mole of a substance. As applied to polymers herein, "molecular weight" in the absence of further qualification denotes viscosity average molecular weight unless otherwise stated.

The terms "parts" and "percent" (or %) denote parts by weight and percentage by weight, respectively, unless otherwise stated.

The monomer emulsions of this invention are compositions in which water constitutes the continuous phase and a monomer or mixture thereof containing dissolved polymeric co-surfactant constitutes the disperse phase. Emulsions of this invention are the oil-in-water type. The disperse or organic phase constitutes from about 10 to about 50 percent of total emulsion weight, and conversely the continuous or aqueous phase constitutes about 50 to about 90 percent of total emulsion weight. The disperse phase, consisting essentially of monomer(s) and dissolved polymeric co-surfactant, is present as droplets having an average droplet diameter from about 10 to about 500 nanometers, preferably from about 80 to about 150 nanometers.

Both homopolymers and copolymers can be prepared according to this invention. The monomeric starting material is a monomer or mixture thereof, i.e., one or more monomers. The monomer or monomers are addition polymerizable ethylenically unsaturated organic compounds which are essentially insoluble in water, i.e., which have water solubilities ranging from 0 to about 5 weight percent, preferably from 0 to about 3 weight percent. Solubilities are measured in pure water and denote grams of dissolved monomer per 100 grams of water.

Representative monomers which can be polymerized according to this invention include: methyl methacrylate (MMA), styrene, vinyl acetate, chloroprene, methyl acrylate, ethyl acrylate, and vinyl chloride. Monomers for forming copolymers include methyl methacrylate and one or more additional acrylic monomers (e.g., 2-hexyl ethyl acrylate), styrene and acrylonitrile, styrene and maleic anhydride, styrene and p-methyl styrene, vinyl chloride and vinylidene chloride, and vinyl chloride and vinyl acetate. These lists are representative and do not purport to be exhaustive.

The polymeric co-surfactant is a polymer which is both highly water insoluble and highly soluble in the monomer of choice. The polymeric co-surfactant may be a polymer (e.g., homopolymer, copolymer, or block or graft copolymer) or a mixture or blend thereof having a viscosity molecular weight in the range of about 3,000 to about 1,100,000, preferably from about 9,000 to about 750,000. Especially preferred co-surfactants are those having a viscosity molecular weight in the range of about 350,000 to about 750,000.

Representative polymeric co-surfactants useable in the present invention include polymethyl methacrylate (PMMA), polystyrene, polyvinyl acetate, polymethylacrylate and polyethylacrylate. Certain copolymers such as styrene-isoprene copolymer, and certain block polymers such as poly (styrene-block-butadiene) and poly (styrene-block-isoprene) are also useful. Other polymeric co-surfactants may be used as long as they meet the above criteria of being essentially insoluble in water but soluble in the monomer or monomer mixture, and are innocuous in the final product. A polymer co-surfactant which is a polymer of the monomer undergoing polymerization is preferred. Thus, polymethyl methacrylate is a preferred co-surfactant when methylmethacrylate is the monomer. However, one may choose, as polymeric co-surfactant, a polymer which is not the polymer obtained by polymerization of the monomer of choice.

The amount of polymeric co-surfactant may be from about 0.5 to about 5.0 percent by weight based on monomer plus polymer. Preferably the amount of polymeric co-surfactant is from about 0.5 to about 2.0 percent by weight based on monomer plus polymer.

The polymeric co-surfactant dissolves in the monomer or monomer mixture to form the disperse (or organic) phase of the monomer emulsion. The resulting solution (the disperse phase) is an essentially homogeneous mixture of monomer and polymer. As previously indicated, the disperse phase (monomer plus polymer) is in the form of droplets ranging from about 10 to about 500 nanometers in diameter.

Conventional surfactants for emulsion polymerization may be used. Either a single surfactant or a mixture of surfactants may be used. Representative surfactants include: sodium lauryl sulfate and other alkyl sulfates; sodium dodecyl benzene sulfonate and other alkyl and aryl sulfonates; sodium stearate and other fatty acid salts; and polyvinyl alcohol and other non-ionic surfactants. The surfactant may be either an anionic, cationic or a non-ionic surfactant. When a mixture or combination of surfactants is used, the mixture may include an anionic or a cationic surfactant, plus a non-ionic surfactant, or two or more anionic or cationic surfactants, or two or more non-ionic surfactants.

The mount of surfactant is from about 0.5 to about 5.0 percent by weight, based on monomer plus polymer. The preferred amount is from about 0.5 to about 1.5 percent by weight, based on monomer plus polymer.

Use of a polymeric co-surfactant in accordance with this invention results in improved monomer emulsion stability. This is accomplished by a reduction in monomer droplet diameter, which in turn is attributable to the fact that the co-surfactant reduces or prevents Ostwald ripening. As pointed out earlier, Ostwald ripening is the transfer of monomer from small droplets to large droplets to reduce the total surface energy of the system, resulting in an increase of the average droplet diameter in an emulsion. (The other cause of growth in monomer droplet size is coalescent, which is inhibited by the surfactant or mixture thereof.) By inhibiting diffusion of monomer from small droplets to large droplets, a co-surfactant slows down the emulsion breakdown process. In a macroemulsion (a monomer emulsion for a conventional emulsion polymerization in which no co-surfactant is used), disappearance of the small monomer droplets takes place in seconds, before nucleation can take place. When a co-surfactant according to this invention is used, Ostwald ripening is retarded so that nucleation of the monomer droplets takes place. In fact, it is possible to completely polymerize a miniemulsion of this invention prior to the onset of significant ripening.

A further advantage of a polymeric co-surfactant in accordance with this invention is that it is innocuous in the final product. This is accomplished by appropriate choice of a co-surfactant, and preferably by using as co-surfactant a polymer of the monomer being polymerized. In contrast, previously known emulsion polymerization processes employing a non-polymerizable organic compound such as hexadecane as co-surfactant, have in the final product latex a residue of the organic compound.

Both the mount and the average molecular weight of the co-surfactant affect the monomer droplet size and monomer droplet size distribution. The amount of surfactant also affects monomer droplet size and monomer droplet size distribution. The optimum molecular weight range for promoting monomer emulsion stability is from about 350,000 to about 750,000. For any given concentration of polymeric co-surfactant, particle size is smaller and stability is less when the co-surfactant molecular weight is either lower than or higher than the preferred range.

Monomer emulsions according to the present invention are prepared as follows:

First, the desired amount of polymeric co-surfactant is added (usually as a bulk polymer) to the monomer or mixture thereof, then mixed with gentle agitation (e.g., with a stirring bar) at room temperature until the polymer is dissolved. The entire quantities of both polymeric co-surfactant and monomer or mixture thereof to be used in forming the monomer emulsion are mixed in this manner. While the temperature in this step is not critical (in general, any temperature between the freezing point and the boiling point of the monomer can be used), preferred temperatures for monomer miniemulsion formation are from about 20° to about 50° C., especially from about 25° to about 40° C.

Second, the solution of polymer in monomer prepared in the previous step is added to a previously formed solution of surfactant(s) in water. The entire contents are then subjected to high shear in order to form a miniemulsion. Suitable high shear mixing is obtained, for example, by sonication with a Fisher 300 Watt Sonic dismembrator for 5 minutes at 60 percent output (180 watts) with bulk mixing provided by a stirring bar. (The Fisher 300 Watt Sonic dismembrator is manufactured and distributed by Fisher Scientific Company, Pittsburgh, Pa. Fisher Scientific Company is a subsidiary of Allied-Signal, Inc., Morristown, N.J.) Other high shear mixing equipment, e.g., a colloid mill or homogenizer can be used if desired. (The sonic dismembrator herein described is suitable for laboratory scale. A colloid mill or homogenizer are suitable for production scale.) In general, any equipment capable of producing localized high shear along with moderate bulk mixing can be used.

While it is preferable to premix the surfactant (or surfactants) and water so as to form an aqueous surfactant solution before adding the solution of polymer in monomer, it is possible to charge the polymer in monomer solution, water and surfactant separately to a vessel which is equipped with an agitator or mixer capable of emulsifying the contents.

The above steps result in the formation of an essentially stable monomer emulsion which comprises an aqueous continuous phase comprising water and at least one surfactant dissolved therein, and an organic disperse phase which contains the monomer content and the polymer content of the emulsion, i.e., an ethylenically unsaturated monomer or mixture thereof and one or more polymers dissolved therein. The disperse phase is an essentially homogenous mixture of one or more monomers and one or more polymers. The disperse phase is in the form of droplets having an average droplet diameter from about 10 nanometers to about 500 nanometers, preferably from about 80 to about 150 nanometers.

The aqueous monomer emulsion is essentially stable. The emulsion slowly "creams", i.e., the disperse phase slowly rises to the top so that a visible phase separation line appears. However, the shelf life of a miniemulsion of this invention will vary from about 60 minutes to about 24 hours, depending on the amount of surfactant and the amount of polymeric co-surfactant used (and also whether or not the polymeric co-surfactant is a polymer of the monomer undergoing polymerization). In any case, the shelf life is sufficiently long so that the monomer content of the emulsion can be polymerized in less time than the time required for phase separation or "creaming". (The term "creaming" and variants thereof such as "cream" and "creams" refer to phase separation which takes place in unhomogenized milk, wherein butterfat globules slowly rise to the top of the container. Creaming in milk is readily observable when the milk with a cream is contained in a glass bottle or other transparent container.)

The monomer content of the monomer emulsion is polymerized under free radical polymerization conditions in the presence of a free radical initiator. Both the initiator and the conditions may be conventional. Free radical polymerization conditions are generally obtained by adding a free radical initiator and allowing polymerization to take place.

Suitable free radical initiators are known in the art. These include, for example, the organic peroxide such as benzoyl peroxide, lauroyl peroxide and dicumyl peroxide; and inorganic persulfates such as potassium persulfate or ammonium persulfate; azobis-(isobutyro nitrile) (AIBN), and redox pairs such as $Fe^{2+}/H_2O_2$; $ROH/Ce^{4+}$ (where R is an organic group such as lower alkyl or aryl); $K_2S_2O_8/Fe^{2+}$ and peroxide/amine. The initiators used in the present invention in general are known in the art. Basically, any free radical generating system which is effective at the polymerization temperature can be used. The type of initiator is not critical to this invention. The polymerization initiator may be either a water soluble or an oil soluble compound, and examples of both types of initiators have been cited.

Miniemulsion polymerizations according to the present invention often proceed at a more rapid reaction rate than do macroemulsion (conventional emulsion) polymerizations in which the composition is the same except for the absence of the co-surfactant. However, data establish that fractional conversion versus time (which is indicative of reaction rate) of miniemulsion polymerizations of this invention increase slightly as the concentration of co-surfactant is increased within the overall range specified above (i.e., about 0.5 to about 5 percent by weight of polymeric co-surfactant based on monomer).

Polymerization may be carried out over a broad temperature range, e.g., from about 20° to about 70° C. The preferred polymerization temperature depends on the choice of initiator. A preferred polymerization temperature range is from about 25° to about 50° C.

The polymer particle size in the product polymer emulsion or latex is in the range of about 10 to about 500 nanometers, which is the same range as that of the monomer droplets in the monomer emulsion. There is no substantial change in particle size during polymerization in most cases. Usually the product polymer particle size will be in the range from about 50 to about 500 nanometers. The preferred product polymer particle size range is from about 80 to about 150 nanometers.

Polydispersity, or particle size distribution, in both monomer emulsions and polymer latexes of this invention, is generally from about 1.005 to 1.040, and usually from about 1.008 to about 1.039. The polydispersity values of both monomer emulsions and polymer latexes herein are generally lower than those of conventional monomer emulsions and conventional polymer latexes, indicating that the products in both monomer emulsions and polymer latexes) of this invention have narrower particle size distributions than do conventional monomer emulsions and polymer latexes. A product is considered to be of substantially uniform particle size if its polydispersity index is 1.005 or less. Polydispersity of droplet or particle size distribution is defined as the ratio of the number average diameter to weight average diameter.

The narrow particle size range of both monomer emulsions and polymer latexes of this invention, as indicated by the low polydispersity index, correlates with increased stability of both the monomer emulsions and the polymer latexes of this invention as compared to those of the prior art in which no co-surfactant is used. Significant advantage of emulsion polymerization according to the present invention as compared to conventional emulsion polymerization without a co-surfactant is that the monomer emulsions (or miniemulsions) of the present invention are stable for a longer period of time than that required to complete polymerization. This leads to greater uniformity of product polymer particle size. Another advantage of emulsion polymerization processes of this invention is that they are more robust to contamination than conventional emulsion polymerization processes. As compared to previously known processes employing a non-polymeric co-surfactant, e.g., hexadecane, the product polymers of this invention are advantageous in that there are no non-polymeric diluent or contaminant present. Hexadecane, in contrast, goes through the polymerization reaction unchanged, and is present in the polymer product. It is preferably removed, requiring an additional step which is costly and difficult.

Polymer latexes produced according to the present invention in general are useful for the same purposes as polymer latexes already known in the art. Polymer latexes are known in the art, for example, as binders for both interior and exterior paints. Similarly, the polymer latexes of this invention are well-suited for this purpose. Other uses include manufacture of synthetic rubber and bulk plastic. In general, the polymer latexes of this invention, like those in the art, have a variety of uses where film forming ability is required or desirable.

Polymer latexes of this invention may also be used in situations in which polymer latexes previously known have not gained general acceptance. Such uses include, for example, applications requiring very high shear stability or high monodispersity of size.

This invention will now be described in further detail with reference to the examples which follow.

In the following examples, the word "emulsion" is taken to mean emulsions (with or without polymeric co-surfactant) which have been created and evaluated for stability. The word "latex" is used to connote emulsions in which the monomer has been polymerized to form polymeric latexes. The "polydispersity" of the droplet or particle size distribution will be deemed as the ratio of the number average diameter to weight average diameter.

EXAMPLE 1

Miniemulsions were prepared using the following reagents:

Methyl methacrylate (MMA) monomer, inhibited with 10 ppm methylethyl hydroquinone;

Sodium lauryl sulfate (SLS) (surfactant);

Deionized (DI) water;

Co-surfactant (none, hexadecane, or polymethyl methacrylate), as shown in Table 1 below.

In run A, a control run, no co-surfactant was used. In run B, a comparison run, according to prior art, hexadecane was used as the co-surfactant. In run C, which is according to this invention, polymethyl methacrylate (PMMA) was used as the co-surfactant.

Miniemulsions were prepared by varying soap concentration, co-surfactant concentration, and molecular weight of the co-surfactant as follows:

500 g H$_2$O;

200 g MMA (methyl methacrylate);

1.0 g of SLS (sodium lauryl sulfate);

co-surfactant (as shown in Table 1);

5 minutes of sonication at 60% full output.

The desired mount of polymeric co-surfactant was added to the appropriate amount of monomer, then mixed with a stirring bar at room temperature until the polymer was dissolved. This solution was then added to a previously-prepared surfactant solution. The entire contents were then sonicated with a Fisher 300 Watt Sonic dismembrator for 5 minutes at 60% output (180 W), with bulk mixing provided by the stirring bar. Shelf-life was measured by placing approximately 30 mL of an emulsion in a capped glass vial and observing the time necessary for a visible creaming (phase separation) line to appear. Results are shown in Table 1. Whereas the conventional emulsion (no co-surfactant) creamed after less than 15 minutes, both the miniemulsion employing hexadecane as the co-surfactant (known technology) and polymeric (PMMA) co-surfactant (this invention) remained stable for more than sufficient time to allow polymerization.

TABLE 1

DATA FROM EXAMPLE 1
SHELF LIFE STABILITY OF EMULSIONS

| Run | Monomer | Co-surfactant | Time to Visible Creaming |
|---|---|---|---|
| A | Methyl Methacrylate | None | <15 minutes |
| B | Methyl Methacrylate | Hexadecane (10 g) | 3 weeks |
| C | Methyl Methacrylate | Polymethyl Methacrylate (8 g) | 24 hours |

EXAMPLE 2

Miniemulsions were prepared using the following reagents:

Methyl methacrylate (MMA) monomer, inhibited with 10 ppm methylethyl hydroquinone;

Sodium lauryl sulfate (SLS);

Deionized (DI) water;

Polymeric co-surfactant.

Polymeric co-surfactants were obtained through solution polymerizations with varied amounts of chain transfer agent (carbon tetrachloride) and initiator (AIBN) to adjust molecular weight. Viscometry was used to measure the molecular weight of the polymethyl methacrylate co-surfactant.

Miniemulsions were prepared by varying soap concentration, co-surfactant concentration, and molecular weight of the co-surfactant as follows:

500 g $H_2O$;

200 g MMA (methyl methacrylate);

1.0 or 2.0 g of SLS (sodium lauryl sulfate);

2.0, 4.0, 6.0 or 8.0 g of PMMA (polymethyl methacrylate) with viscosity average molecular weights of 33,000, 94,000, 350,000 or 1,050,000 g/gmol;

5 minutes of sonication at 60% full output.

Amounts of sodium lauryl sulfate and polymethyl methacrylate, and viscosity average molecular weights of PMMA, are shown on a run-by-run basis in Table 2.

The desired amount of polymeric co-surfactant was added to the appropriate amount of monomer, then mixed with a stirring bar at room temperature until the polymer was dissolved. This solution was then added to a previously-prepared surfactant solution. The entire contents were then sonicated with a Fisher 300 Watt Sonic dismembrator for 5 minutes at 60% output (180 Watt), with bulk mixing provided by the stirring bar.

Shelf-life was measured by placing approximately 30 ml. of an emulsion in a capped glass vial and observing the time necessary for a visible creaming (phase separation) line to appear. Droplets sizes were measured by a Malvem Autosizer IIc, manufactured by Malvem Instrument, Inc., Southborough, Mass. Using a quartz cuvette, the emulsions were diluted with a saturated solution of monomer and DI water to about 50:1. The diluent, being saturated with monomer, was not found to be a "sink" for the monomer, which would affect the droplet size.

Results are shown in Table 2. Shelf lives above one hour are considered to be stable miniemulsions, since it is possible to polymerize the emulsion before significant degradation occurs. In contrast, conventional emulsions (without co-surfactant) cream in a matter of a few minutes. The variables affecting the shelf-life were the surfactant concentration, the co-surfactant concentration, and the molecular weight of the co-surfactant.

Emulsions are stable, over the entire co-surfactant molecular weight range tested which is from 33,000 to 1,050,000. The most stable emulsions, as shown by the longest shelf-life in Table 2, were those obtained using PMMA of 350,000 molecular weight as the co-surfactant. It can be further seen that within this range the stability can be further enhanced by low surfactant levels and high co-surfactant levels.

The droplet sizes for the miniemulsions ranged from 19.5 to 141.2 nanometers. Table 2 shows the droplet size decreasing for both increases in co-surfactant and decreases in the surfactant concentration. Miniemulsions stabilized with polymeric co-surfactant had polydispersities of between 1.008 and 1.039.

TABLE 2

DATA FROM EXAMPLE 2
MINIEMULSIONS

| SLS[1] (g) | PMMA[2] (g) | MW PMMA | Shelf Life (min) | Average[3] Droplet Diam. (nm) |
|---|---|---|---|---|
| 1.0 | 6.0 | 33,000 | 80 | 53.00 |
| 1.0 | 8.0 | 33,000 | 134 | 47.60 |
| 1.0 | 2.0 | 94,000 | 70 | 46.90 |
| 1.0 | 4.0 | 94,000 | 105 | 49.50 |
| 1.0 | 6.0 | 94,000 | 118 | 47.80 |
| 1.0 | 8.0 | 94,000 | 195 | 27.30 |
| 1.0 | 2.0 | 350,000 | 90 | 24.20 |
| 1.0 | 4.0 | 350,000 | 141 | 57.30 |
| 1.0 | 6.0 | 350,000 | 213 | 141.20 |
| 1.0 | 8.0 | 350,000 | 353 | 40.60 |
| 2.0 | 8.0 | 350,900 | 126 | 58.70 |
| 1.0 | 2.0 | 1,050,000 | 60 | 82.70 |
| 1.0 | 4.0 | 1,050,000 | 113 | 42.80 |
| 2.0 | 4.0 | 1,050,000 | 103 | 38.90 |
| 1.0 | 6.0 | 1,050,000 | 113 | 58.50 |

[1]Sodium lauryl sulfate
[2]polymethyl methacrylate
[3]Number average droplet diameter

EXAMPLE 3

Miniemulsion emulsions were formed according to the procedure in Example 2 and subsequently polymerized to latexes using the following recipe and procedure:

500 g DI water;

200 g MMA;

1.0, 2.0 or 3.0 g SLS;

2, 4, 6 or 8 g of polymeric co-surfactant (MW=350,000 g/gmol);

0.675 g $K_2S_2O_8$ (initiator);

5 minutes of sonication at 60% full output.

The above recipe is that used in forming the monomer miniemulsion. The recipe for polymerization is the same except that 0.675 g of potassium persulfate (initiator) is added.

The inhibited monomer was washed with 40 mL of a 5% NaOH solution, then subsequently with a saturated NaCl solution to remove the methyl ethyl hydroquinone. The monomer was then transferred to a covered vessel. Pre-weighted polymeric co-surfactant was then allowed to dissolve in the monomer with gentle agitation.

After the polymer was totally dissolved, it was added to the desired SLS solution, and then sonicated for 5 minutes at 60% of full output. The monomer emulsion was then transferred to a reaction flask and submerged in a water bath at 60° C. Agitation was provided by a paddle wheel stirrer with a rpm of 700±100. To continuously measure conductance, a recycle loop containing the conductance cell was then attached. After the nitrogen purge, the initiator, 0.675 g of $K_2S_2O_8$ in aqueous solution, was injected through a syringe. Every 5 minutes, for the first 30 minutes after initiation, samples (approximately 10 mL) were draw for gravimetric conversion analysis. Samples were then taken every 10 minutes for the duration of the polymerization. These drawn samples were added to a 0.5% wt. percent solution of hydroquinone and placed in a refrigerator.

The final latexes were diluted 100:1 with a 0.02 wt. percent solution of SLS. Particles sizes and particle size distributions were then measured on the Malvern Autosizer. To ascertain the latexes' shear stability, they were sonicated again at 60% output for 5 minutes. The particle sizes and distributions were then measured again. Any change in particle size or distribution was noted, especially those accompanying coagulation.

Results are shown in Table 3. The particle sizes for the fully-converted miniemulsion latexes ranged from 90.5 to 126.5 nm. These are on the low end of the range for miniemulsions. These final diameters were found to be dependent on both the co-surfactant and surfactant levels. At a constant co-surfactant level the particle diameter decreases with increasing surfactant. The polydispersities of the latexes ranges from 1.006 to 1.030. Latex with a polydispersity of less than 1.005 is generally considered to be monodisperse. Hence, the feasibility of manufacturing monodispersed latexes with polymeric co-surfactant appears to be quite positive.

In general the average particle size of the miniemulsion latexes was lowered by shearing the latex. This is indicative of some reversible flocculation. The average change in the particle diameter was −11.49%. This corresponds to aggregates existing in the latex having an average of 1.5 particles each. No coagulation was observed in any of the miniemulsion latexes. They showed an increased shear stability, presumably due to their lower polydispersities. By contrast, conventional emulsion latexes coagulated almost immediately upon shearing. Presumably this due to the presence of nucleated droplets that become sites of coagulation or flocculation for the smaller particles.

TABLE 3

DATA FROM EXAMPLE 3
MINIEMULSION LATEXES

| SLS[1] (g) | PMMA[2] (g) | Average[3] Particle Size (nm) | Poly- dispersity[4] | Average[5] Particle Size (nm) | Poly- dispersity[6] |
|---|---|---|---|---|---|
| 1.0 | 2.0 | 119.8 | 1.006 | 129.7 | 1.010 |
| 2.0 | 2.0 | 114.8 | 1.018 | 94.9 | 1.016 |
| 3.0 | 2.0 | 90.5 | 1.014 | 76.0 | 1.011 |
| 1.0 | 4.0 | 118.2 | 1.011 | 116.0 | 1.009 |
| 2.0 | 4.0 | 112.9 | 1.021 | 115.8 | 1.005 |
| 3.0 | 4.0 | 100.2 | 1.020 | 82.1 | 1.013 |
| 1.0 | 6.0 | 126.5 | 1.017 | 117.8 | 1.014 |
| 2.0 | 6.0 | 110.7 | 1.026 | 87.4 | 1.013 |
| 3.0 | 6.0 | 110.3 | 1.024 | 84.9 | 1.026 |
| 1.0 | 8.0 | 125.2 | 1.012 | 142.0 | 1.016 |
| 2.0 | 8.0 | 107.9 | 1.026 | 83.4 | 1.010 |
| 3.0 | 8.0 | 117.3 | 1.030 | 76.0 | 1.015 |

[1]Sodium lauryl sulfate
[2]Polymethyl methacrylate
[3]Number average particle diameter, as polymerized
[4]Polydispersity, as polymerized
[5]Number average particle diameter, after sonication
[6]Polydispersity, after sonication.

EXAMPLE 4

Miniemulsions were prepared using various combinations of monomer and polymeric co-surfactant according to the procedure in Example 2, and with the following recipe:

125 g $H_2O$;

50 g monomer;

6.25 g of SLS (sodium lauryl sulfate);

2.5 g of polymeric co-surfactant (as shown in Table 4);

5 minutes of sonication at 60% full output.

Shelf lives and average droplet sizes are given in Table 4. It may be seen that while it is possible to make effective miniemulsions with various combinations of monomer and polymeric co-surfactant, the optimal polymeric co-surfactant is polymer made from the monomer from which the miniemulsion is to be made.

TABLE 4

DATA FROM EXAMPLE 4
MINIEMULSIONS

| Monomer | Co-surfactant | Shelf Life (hr) | Average[1] Droplet Size (nm) |
|---|---|---|---|
| MMA | Polystyrene (PS) | 4 | 20.8 |
| MMA | PS-block-isoprene | 1 | 20.9 |
| MMA | PS-block-butadiene | 6 | N/A |
| Styrene | Polystyrene (PS) | >24 | 21.5 |
| Styrene | PS-block-butadiene | 1.1 | 20.7 |
| Styrene | PS-block-butadiene | 10 | 20.8 |
| Styrene | PMMA | 8 | 21.0 |

[1]Number average droplet diameter

EXAMPLE 5

Miniemulsions were prepared using the following reagents:

Vinyl Acetate (VAt), inhibited with 14–17 ppm hydroquinone;

Polyvinyl Alcohol (PVA), (88% hydrolyzed, molecular weight, 11,000–31,000);

Deionized (DI) water;

Co-surfactant (none, hexadecane, or polymethyl methacrylate [PMMA]).

Five runs were carried out as follows: Run A—control (no co-surfactant); Runs B and C—comparison runs using hexadecane (HD) as co-surfactant according to prior art teachings; Runs D and E—runs according to this invention, using PMMA as co-surfactant.

Miniemulsions were prepared by varying surfactant (PVA) concentration, and co-surfactant concentration and type, as shown in Table 5. The desired amount of co-surfactant was added to the appropriate amount of monomer, then mixed with a stirring bar at room temperature until the polymer was dissolved. This solution was then added to a previously-prepared surfactant solution. The entire contents were then sonicated with a Fisher 300 Watt Sonic dismembrator for 5 minutes at 60% output (180 W), with bulk mixing provided by the stirring bar.

Shelf-life was measured by placing approximately 30 mL of an emulsion in a capped glass vial and observing the time necessary for a visible creaming (phase separation) line to appear. Droplet sizes were measured by a Malvern Autosizer IIc. Using a quartz cuvette, the emulsions were diluted with a saturated solution of monomer and DI water to about 50:1. The diluent, being saturated with monomer, was not found to be a "sink" for the monomer, which would affect the droplet size. Results are shown in Table 5.

Due to the viscosity of the aqueous phase (brought on by the presence of PVA), all of the shelf lives with PVA as the surfactant are longer than those with low molecular weight surfactants. For this reason, shelf life is not a good test for the production of a miniemulsion with PVA. However, it is clear that whereas the conventional emulsion A (no co-surfactant) produced monomer droplets with a number average droplet diameter of 2,469 nm, the emulsions B and C prepared with hexadecane (HD) produced emulsions with number average droplet diameters of 304 nm or below, and those (D and E) with PMMA as co-surfactant produced miniemulsions with number average droplet diameters of 420 nm or below. Both the miniemulsions B and C made with HD as co-surfactant, and those (D and E) with PMMA as co-surfactant, produce droplets in the miniemulsion range.

TABLE 5

DATA FROM EXAMPLE 5
MINIEMULSIONS
PVA, 10% (wt) solution in DI water - 25.0 g in all runs
Vinyl acetate - 25.0 g in all runs
Deionized (DI) water - 50 g in all runs

| Run | PMMA[1] (g) | HD[2] (g) | Shelf Life (hr) | Average[3] Droplet Diameter (nm) |
|---|---|---|---|---|
| A | 0 | 0 | 3.2 | 2,469 |
| B | 0 | 0.25 | 24.0 | 304 |
| C | 0 | 0.5 | >336 | 130 |
| D | 0.25 | 0 | 4.5 | 420 |
| E | 0.50 | 0 | 7.0 | 313 |

[1]Polymethyl methacrylate (number average molecular weight 100,000)
[2]Hexadecane
[3]Number average droplet diameter While this invention has been described in detail with reference to preferred embodiments, it shall be understood that such description is by way of illustration and not by way of limitation.

What is claimed is:

1. A process for preparing an aqueous monomer emulsion which comprises:
   (a) dissolving one or more polymers in one or more ethylenically unsaturated monomers, thereby forming a polymer-in-monomer solution, and
   (b) combining the polymer-in-monomer solution with water and at least one surfactant and agitating the resulting mixture under high shear, wherein:
      (1) said one or more monomers are insoluble in water;
      (2) said one or more polymers are insoluble in water but soluble in said one or more monomers;
      (3) said one or more polymers have a viscosity average molecular weight of at least about 3000; and
      (4) the amount of said one or more polymers is from 0.5 percent to 5 percent by weight based on the combined weight of monomer(s) and polymer(s);
   thereby obtaining a stable aqueous monomer emulsion comprising an aqueous continuous phase and an organic disperse phase, said disperse phase comprising said one or more monomers and said one or more polymers, said disperse phase being in the form of droplets having an average droplet diameter in the range from about 10 to about 500 nanometers.

2. A process according to claim 1 in which the amount of said one or more polymers is from 0.5 percent to 2.0 percent by weight based on the combined weight of monomer(s) and polymer(s).

3. A process according to claim 1 in which the viscosity average molecular weight of said one or more polymers is from about 9,000 to about 1,100,000.

4. A process according to claim 3 in which the viscosity average molecular weight of said one or more polymers is from about 350,000, to about 700,000.

5. A process according to claim 1 in which the amount of surfactant is from about 0.5 to about 5.0 percent by weight based on the combined weights of monomer(s) and polymer(s).

6. A process according to claim 5 in which the amount of surfactant is from about 0.5 to about 1.5 percent by weight based on the combined weights of monomer(s) and polymer(s).

7. A process according to claim 1 in which the contents of said disperse phase is from about 10 percent to about 50 weight percent based on total emulsion weight.

8. A process according to claim 1 in which said emulsion is formed at a temperature from about 20° to about 50° C.

9. A process according to claim 1 in which the average droplet diameter is from about 80 to about 150 nanometers.

10. A stable aqueous monomer emulsion comprising:
   (a) an aqueous continuous phase comprising water and at least one surfactant dissolved therein, and
   (b) an organic disperse phase comprising one or more ethylenically unsaturated monomers and one or more polymers dissolved therein, wherein:
      (1) said one or more monomers are insoluble in water;
      (2) said one or more polymers are insoluble in water but soluble in said one or more monomers;
      (3) said one or more polymers have a viscosity average molecular weight of at least about 3,000; and
      (4) the amount of said one or more polymers is from 0.5 percent to 5 percent by weight based on the combined weights of monomer(s) and polymer(s);
   said disperse phase being in the form of droplets having an average droplet diameter from about 10 to about 500 nanometers and wherein a resulting polymer particle size has an average particle diameter from about 10 to about 500 nanometers.

11. A monomer emulsion according to claim 10 in which the amount of said one or more polymers is from 0.5 to 2.0 percent by weight based on the combined weights of monomer(s) and polymer(s).

12. A monomer emulsion according to claim 10 in which the viscosity average molecular weight of said one or more polymers is from about 9,000 to about 1,100,000.

13. A monomer emulsion according to claim 12 in which the viscosity average molecular weight of said one or more polymers is from about 350,000 to about 750,000.

14. A monomer emulsion according to claim 10 in which the amount of surfactant is from about 0.5 to about 5 percent by weight based on the combined weights of monomer(s) and polymer(s).

15. A monomer emulsion according to claim 14 in which the amount of surfactant is from about 0.5 to about 1.5 percent by weight based on the combined weights of monomer(s) and polymer(s).

16. A monomer emulsion according to claim 10 in which the content of said disperse phase is from 10 percent to 50 percent by weight of the total emulsion weight.

17. A monomer emulsion according to claim 10 wherein the average droplet diameter is from about 80 to about 150 nanometers.

18. A process which comprises subjecting a monomer emulsion according to claim 10 to free radical polymerization conditions, thereby polymerizing the one or more monomers in said emulsion and forming a polymer emulsion in which the polymer content is in the form of particles having an average particle size in the range from about 10 to about 500 nanometers.

19. A process according to claim 18 in which polymerization is carried out at a temperature in the range of about 20° to about 70° C.

20. A process according to claim 18 which further comprises an initiator which is an inorganic persulfate.

21. A process according to claim 18 in which the average polymer particle size is from about 80 to about 150 nanometers.

22. A stable polymer emulsion obtained by the process of claim 18.

23. A stable polymer emulsion according to claim 22 having a polydispersity index of 1.005 to about 1.040.

24. A polymer emulsion according to claim 22 in which the disperse phase is essentially free of non-polymeric organic material.

25. The product of the process of claim 1.

* * * * *